(12) United States Patent
Mouri (10) Patent No.: US 12,109,937 B2
(45) Date of Patent: Oct. 8, 2024

(54) VEHICULAR DRAWING DEVICE (71) Applicant: TOYOTA JIDOSHA KABUSHIKI KAISHA, Aichi-ken (JP)

(72) Inventor: Fumihiko Mouri, Owariasahi (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 3 days.

(21) Appl. No.: 17/978,211

(22) Filed: Nov. 1, 2022

(65) Prior Publication Data
US 2023/0158947 A1 May 25, 2023

(30) Foreign Application Priority Data

Nov. 19, 2021 (JP) .................. 2021-188592

(51) Int. Cl.
*B60Q 1/34* (2006.01)
*B60Q 1/50* (2006.01)
(52) U.S. Cl.
CPC .................. *B60Q 1/34* (2013.01); *B60Q 1/50* (2013.01); *B60Q 2400/50* (2013.01)
(58) Field of Classification Search
CPC ........ B60Q 1/34; B60Q 1/50; B60Q 2400/50; B60Q 1/547; B60Q 1/38
See application file for complete search history.

(56) References Cited

U.S. PATENT DOCUMENTS

| | | | |
|---|---|---|---|
| 2009/0306852 A1 | 12/2009 | Ikeda et al. | |
| 2017/0267167 A1 | 9/2017 | Sakata et al. | |
| 2018/0118095 A1* | 5/2018 | Kunii | B60Q 1/085 |
| 2020/0346704 A1 | 11/2020 | Mochizuki et al. | |

FOREIGN PATENT DOCUMENTS

| | | |
|---|---|---|
| JP | 2009-298360 A | 12/2009 |
| JP | WO2016027314 A1 | 4/2017 |
| JP | 2021-079835 A | 5/2021 |
| JP | 202179907 A | 5/2021 |
| WO | 2019/159220 A1 | 8/2019 |
| WO | 2021/006217 A1 | 1/2021 |

* cited by examiner

*Primary Examiner* — Daryl C Pope
(74) *Attorney, Agent, or Firm* — HAUPTMAN HAM, LLP (57) ABSTRACT

A vehicular drawing device is mounted in a vehicle and draws an indication mark of a predetermined shape on a road surface in a traveling direction of the vehicle using light. Drawing of the indication mark on the road surface is performed when a direction indicator is operating or when steering of the vehicle is being performed. Drawing of the indication mark is stopped or a direction in which the indication mark is drawn is changed when predetermined conditions are satisfied.

6 Claims, 11 Drawing Sheets

VEHICULAR DRAWING DEVICE

CROSS-REFERENCE TO RELATED APPLICATION

This application claims priority to Japanese Patent Application No. 2021-188592 filed on Nov. 19, 2021, incorporated herein by reference in its entirety.

BACKGROUND

1. Technical Field

The disclosure relates to a vehicular drawing device that is mounted in a vehicle and draws an indication mark of a predetermined shape on a road surface in a traveling direction of the vehicle using light.

2. Description of Related Art

A vehicle includes a direction indicator and notifies another vehicle, a pedestrian, or the like of a traveling direction of the vehicle using the direction indicator.

A device that displays an indication mark of a traveling direction on a road surface has also been proposed in addition to the direction indicator. That is, by projecting (drawing) an image of an indication mark on a road surface in a traveling direction of a vehicle, another vehicle or the like is able to easily recognize the traveling direction of the vehicle. In a technique disclosed in Japanese Unexamined Patent Application Publication No. 2021-079907 (JP 2021-079907 A), when a plurality of vehicles is arranged in a longitudinal line at a crossing or the like, drawing of an indication mark is controlled such that the drawing of the indication mark does not optically affect a preceding vehicle or a host vehicle.

SUMMARY

In JP 2021-079907 A, whether to draw the indication mark is controlled based on a longitudinal distance between the vehicles in the longitudinal line. However, various cases are conceivable as traffic environments, and drawing of an indication mark may not be appropriate in cases other than a case in which a distance in the longitudinal direction between vehicles is small. Accordingly, there is room for improvement in controlling drawing of an indication mark of a traveling direction.

According to an aspect of the disclosure, there is provided a vehicular drawing device that is mounted in a vehicle and draws an indication mark of a predetermined shape on a road surface in a traveling direction of the vehicle using light, wherein drawing of the indication mark on the road surface is performed when a direction indicator is operating or when steering of the vehicle is being performed, and drawing of the indication mark is stopped or a direction in which the indication mark is drawn is changed when predetermined conditions are satisfied.

Drawing of the indication mark indicating that the vehicle is traveling to an oncoming lane may be stopped when there is an oncoming vehicle.

Drawing of the indication mark may not be stopped when the vehicle is located within a crossing.

Drawing of the indication mark outward from a lane which is a lane change destination may be stopped when a lane in which the vehicle is traveling is being changed.

Drawing of the indication mark may be stopped when the vehicle passes over a sidewalk on a roadside to enter the sidewalk and the direction indicator is operating but steering is not being performed.

When the vehicle passes over a sidewalk on a roadside to enter a road, drawing of an indication mark in a direction parallel to the sidewalk on the roadside on the sidewalk may be prohibited or an indication mark which is drawn may be changed to display entrance into the road.

By drawing an indication mark indicating the traveling direction of the vehicle on a road surface, the traveling direction of the vehicle can be notified to the surroundings of the vehicle in an easier-to-understand manner, but a misunderstanding may be caused or a problem may be caused depending on a timing at which the indication mark is drawn. According to the aspect of the disclosure, it is possible to perform more appropriate drawing of an indication mark based on surrounding situations.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, an embodiment of the disclosure will be described with reference to the accompanying drawings. The disclosure is not limited to the embodiment.

"Entire Configuration"

Figure 1:
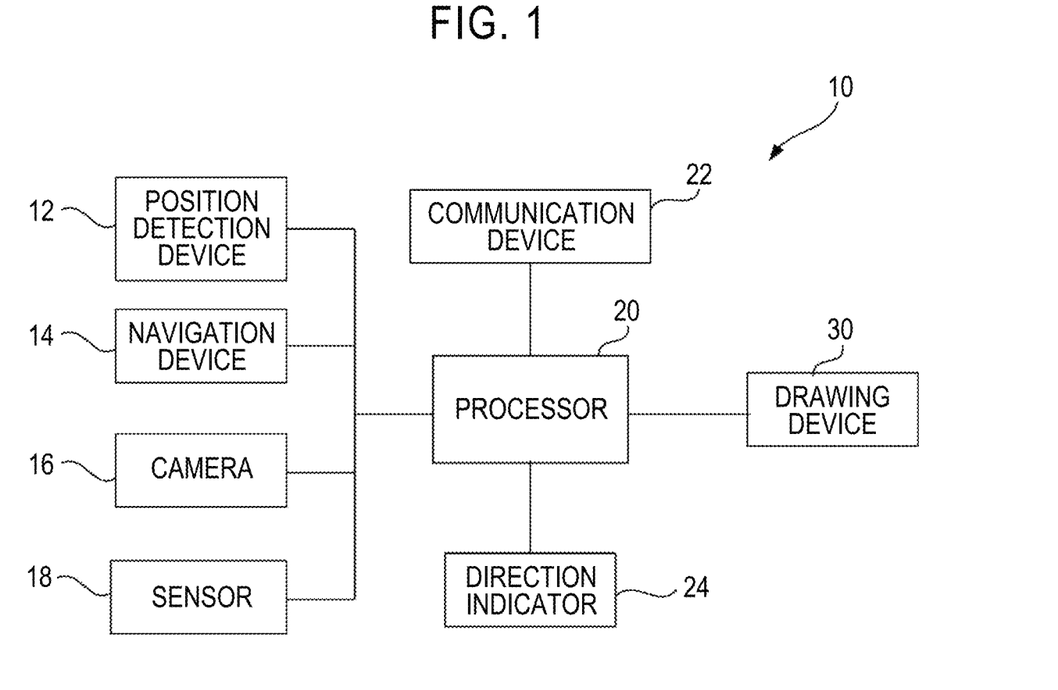
FIG. 1 is a block diagram illustrating a configuration of a vehicular drawing device according to an embodiment.

FIG. 1 is a block diagram illustrating a configuration of a vehicular drawing device 10 according to an embodiment.

The vehicular drawing device 10 is mounted in a vehicle and draws an indication mark of a traveling direction of the vehicle on a road surface near the vehicle.

A position detection device 12 includes a global navigation satellite system (GNSS) such as a global positioning system (GPS) and detects a position of the vehicle. The position detection device 12 may acquire position information from a communication device (for example, a traffic signal) provided at a crossing or the like or acquire information from a traffic management center or another vehicle by communication or may refer to surrounding circumstances or surrounding images of the vehicle.

A navigation device 14 includes a map database and assists with movement of the vehicle by displaying a map on a display, displaying a position of the vehicle on the displayed map, displaying a route acquired as a result of searching for a route to a destination, or acquiring traffic congestion information and changing the route.

A camera 16 acquires surrounding images of the vehicle required for movement of the vehicle. The camera 16 acquires image signals using an imaging device such as a charge-coupled device (CCD) or a complementary MOS (CMOS).

A sensor 18 is configured to detect a vehicle state and includes a vehicle speed sensor, a brake sensor, an accelerator sensor, a steering sensor, and a temperature sensor.

Data from the position detection device 12, the navigation device 14, the camera 16, and the sensor 18 is supplied to a processor 20. The processor 20 is constituted by a computer including a CPU, a RAM, and a ROM and processes various types of data by executing various programs. For example, the processor 20 detects a nearby vehicle such as an oncoming vehicle or an obstacle, calculates a risk of collision based on a relative position, a relative speed, and the like with respect thereto, and controls traveling of the vehicle or controls an indication mark based on the results of detection.

A communication device 22 is connected to the processor 20. The communication device 22 performs various types of radio communication with external communication devices. Data required for the navigation device 14 or the position detection device 12, images of the surrounding environment, information of traveling conditions of other vehicles, and the like can also be acquired via the communication device 22.

A direction indicator 24 is connected to the processor 20. The direction indicator 24 generates right/left turn signals through a driver's operation and turns on and off or turns on a corresponding direction indicator lamp (a turn lamp). A signal associated with the operation of the turn lamp (a signal associated with on/off of the right and left turn lamps) is supplied to the processor 20.

A drawing device 30 is connected to the processor 20. The drawing device 30 draws an indication mark of a predetermined shape indicating a traveling direction on a road surface and includes a projector that projects an image using light from an LED or the like.

For example, when a right-turn signal is output from the direction indicator 24 and the right turn lamp is blinking, the drawing device 30 projects a mark such as an arrow indicating that the vehicle will be traveling to the right or left or an arrow indicating a predicted traveling trajectory on a road surface in front of the vehicle.

"Traveling Direction Mark"

Figure 2:
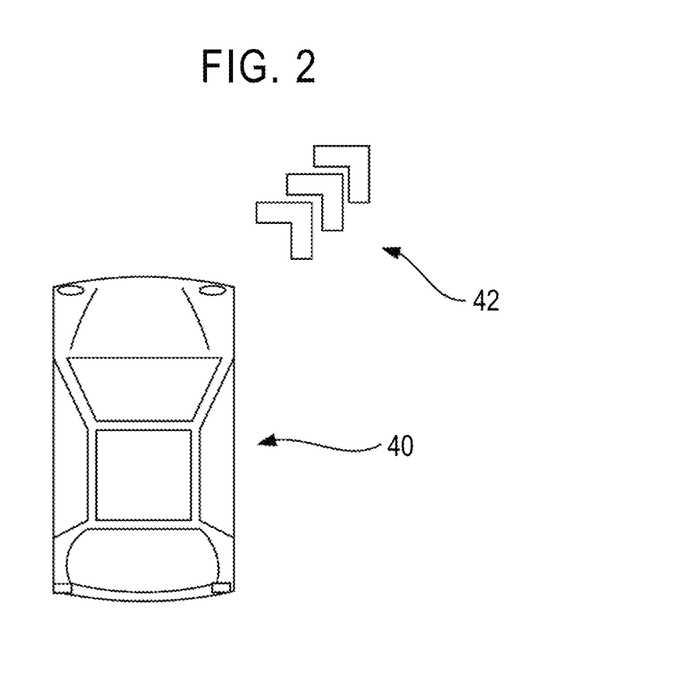
FIG. 2 is a diagram illustrating an example of an indication mark when a traveling direction is changed to right.

FIG. 2 is a diagram illustrating an example of drawing of an indication mark on a road surface when the vehicle is going to turn to right and, for example, a switch for turning to the right (for example, a right turn) in the direction indicator 24 is turned on.

Drawing of an indication mark may be performed by steering. That is, the processor 20 can predict a trajectory of a vehicle 40 based on information from the position detection device 12, the navigation device 14, the camera 16, the sensor 18, and the like. Accordingly, drawing of the indication mark may be controlled based on this result of prediction. Particularly, when corresponding steering is started at a point at which a right turn or a left turn of the vehicle is predicted, drawing of the indication mark can be performed by determining that turn of the vehicle is performed as predicted at that time point.

An indication mark 42 indicating a traveling direction in which three inverted V-shaped marks are arranged in a direction of 45 degrees rightward from the front center of the vehicle 40 is drawn on a road surface. Accordingly, a nearby vehicle, a pedestrian, and the like can understand the traveling direction of the vehicle from the indication mark indicating the traveling direction. The direction indicator 24 of the vehicle operates as usual. When turning to left is performed, the directions are reversed in right and left, and the same indication mark as in the case of the right turn can be employed.

In this specification, it is based on premise that a right turn of the vehicle is traveling crossing an oncoming lane in a road on which a vehicle drives on the left side. In a road on which a vehicle drives on the right side, a left turn is turning of the vehicle crossing an oncoming lane and the same process as in the right turn in this embodiment can be performed in the left turn.

Figure 3:
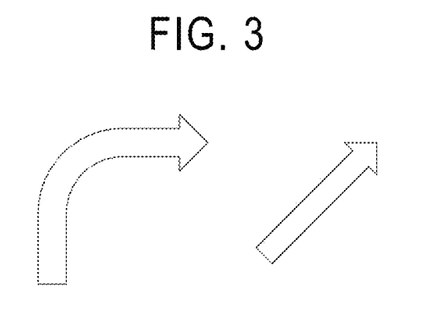
FIG. 3 is a diagram illustrating another example of an indication mark when a traveling direction is changed to right.

FIG. 3 is a diagram illustrating another example of an indication mark when a vehicle turns to right. In this way, a mark turning to right, an arrow mark in a direction of 45 degrees rightward, or the like may be employed.

"Drawing Control of Indication Mark"

Various environments are conceivable as surrounding environments of a vehicle at the time of traveling, and it is necessary to determine whether to perform drawing of an indication mark indicating a traveling direction on a road surface based on the surrounding environment at that time. A specific example of drawing control will be described below.

Entrance into Store by Right Turn

Figure 4:
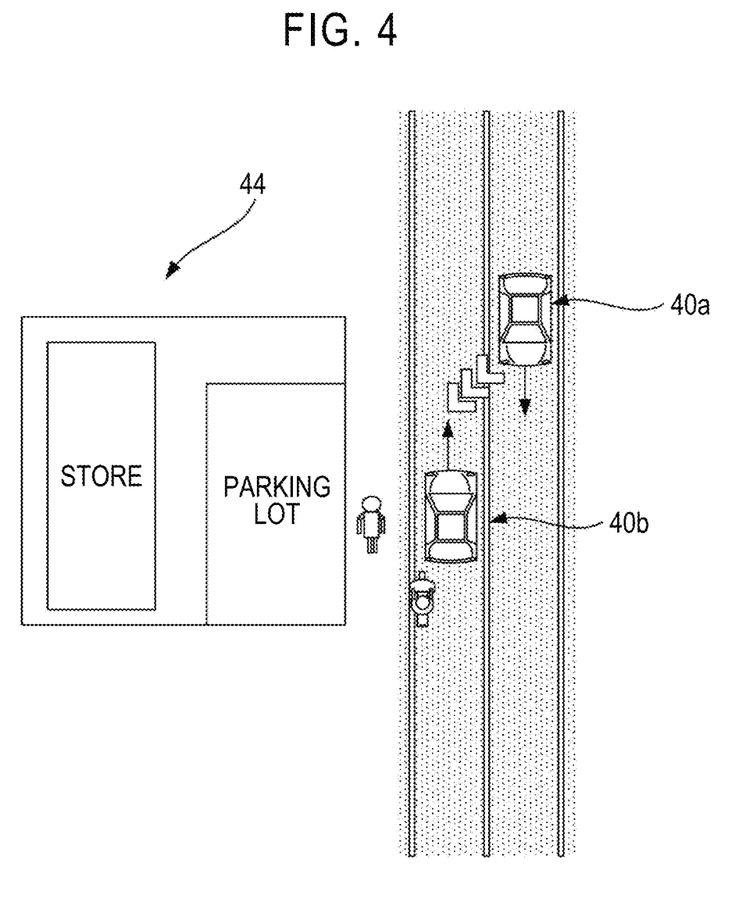
FIG. 4 is a diagram illustrating drawing of an indication mark extending to an oncoming lane.

FIG. 4 is a diagram illustrating stopping of drawing of an indication mark extending to an oncoming lane. In FIG. 4, a vehicle 40a is going to enter a store with a parking lot (for example, a convenience store) 44 on the right of a road with a single lane on each side by a right turn. That is, the vehicle 40a is going to enter the store 44 with crossing an oncoming lane. An oncoming vehicle 40b in the oncoming lane is going to pass by the store 44.

When an oncoming vehicle 40b is not present, is located at a distant position, or stops for a right turn of the vehicle 40a, drawing of an indication mark indicating a right turn in the vehicle 40a does not cause any problem.

On the other hand, when an oncoming vehicle 40b is present and the vehicle 40a is going to enter the store 44 by a right turn (crossing the oncoming lane) after the oncoming vehicle 40b has passed, the oncoming vehicle 40b may misunderstand that the vehicle 40a turns to right when an indication mark is drawn before the oncoming vehicle 40b has passed.

Accordingly, in this case, drawing of an indication mark toward the oncoming lane by the vehicle 40a is stopped.

Figure 5:
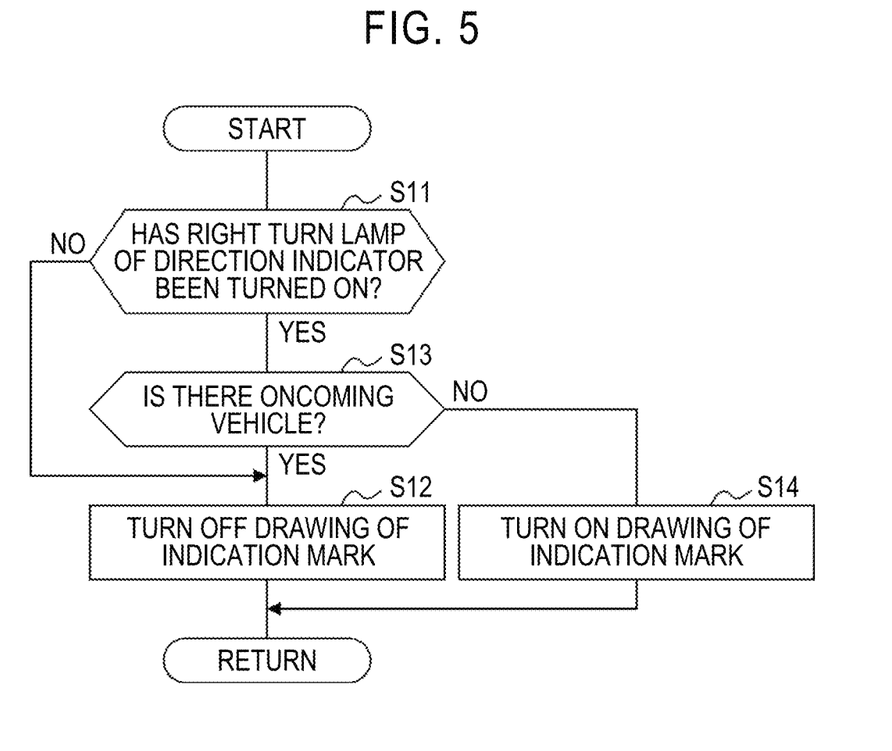
FIG. 5 is a flowchart illustrating a routine for drawing an indication mark extending to an oncoming lane.

FIG. 5 is a flowchart illustrating a routine for drawing an indication mark in this case. First, it is determined whether the direction indicator 24 of the vehicle 40a indicates a right turn (whether a right turn lamp is turned on) (S11). When the determination result of S11 is NO, an off state of the indication mark is maintained and an on state of the indication mark is turned off (S12). When the determination result of S11 is YES, it is determined whether there is an oncoming vehicle 40b (S13). That is, it is determined whether there is an oncoming vehicle 40b which is traveling toward the vehicle 40a and of which passage is waited for by the vehicle 40a within a predetermined distance. This determination can be performed by determining a risk in a right turn based on speeds and positions of the vehicle 40a and the oncoming vehicle 40b.

Here, it is preferable to identify the store 44 which the vehicle 40a is going to enter. For example, when the store 44 is set as a destination in the navigation device 14, the store 44 which the vehicle 40a is going to enter can be determined from the destination. Based on the map data and the vehicle position from the navigation device 14, the store which the vehicle 40a is going to enter may be determined at the time point at which the direction indicator 24 is turned on. When the risk is low as the result of determination of the risk and there is no problem, it is determined in S13 that there is no oncoming vehicle 40b (NO). When the determination result of S13 is NO, drawing of the indication mark is turned on (S14).

On the other hand, when the determination result of S13 is YES, that is, when it is determined that there is an oncoming vehicle 40b with a high risk, drawing of the indication mark is turned off (the drawing is stopped) (S12). When the determination result of S13 is YES and the vehicle 40a is likely to start its right turn (when the risk is equal to or greater than a predetermined value), a warning can be issued or an automatic brake can be operated to stop the right turn. In other words, except for a case in which it can be ascertained that the right turn is not started because the vehicle speed of the vehicle 40a is equal to or lower than a predetermined value or is stopped and a brake pedal is depressed, a warning can be issued. A warning using screen display or sound can be employed as the warning.

In this way, according to this embodiment, drawing of an indication mark indicating a traveling direction is stopped based on the premise that the vehicle 40a does not turn to right when an oncoming vehicle 40b is within a predetermined distance and is traveling toward the vehicle 40a. As a result, it is possible to stop drawing of a confusing indication mark on the oncoming lane.

Lane Change

When lane change is performed, the direction indicator 24 is turned on. Then, the vehicle moves to a neighboring lane and the lane change is completed by returning a steering wheel. The direction indicator 24 may be turned off by returning the steering wheel. While the lane change is being performed, the direction indicator 24 is maintained in an on state, and an indication mark indicating a traveling direction may be drawn over a lane change destination at this time.

Figure 6:
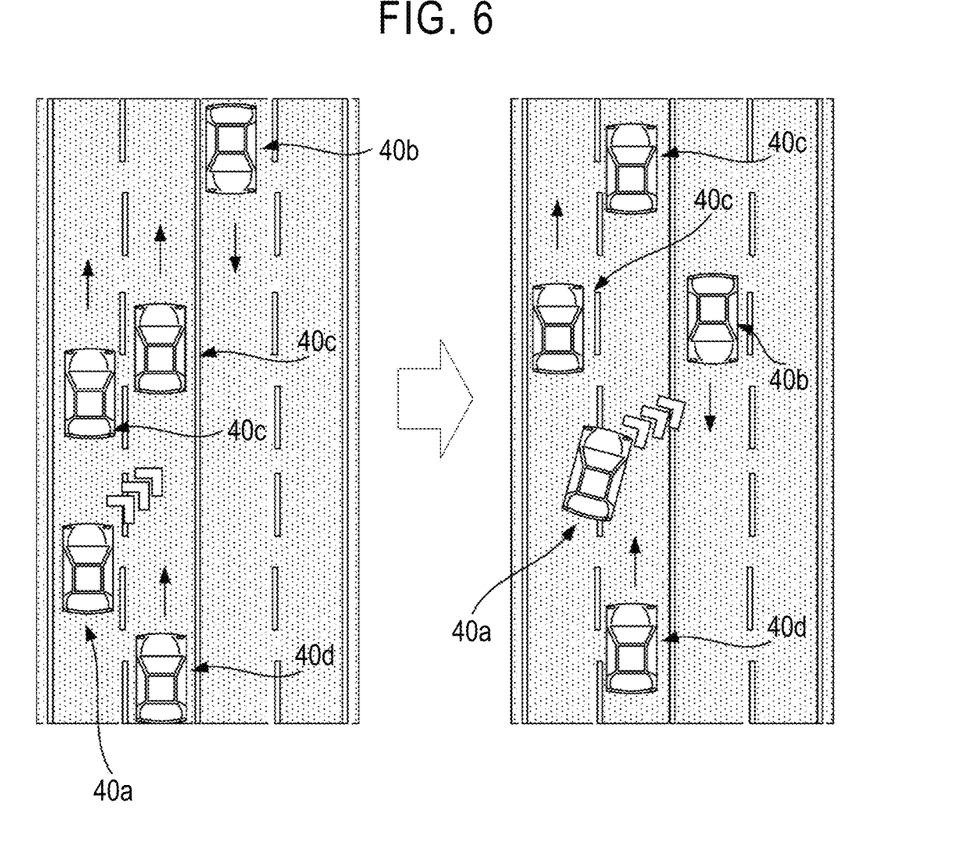
FIG. 6 is a diagram illustrating an example in which an indication mark is drawn to extend over a lane change destination in lane change, where the left part illustrates a state before lane change is started and the right part illustrates a state in which lane change is being performed.

The left part of FIG. 6 illustrates a state before lane change is started, where a vehicle 40a is going to turn to a right lane and the right turn lamp of the direction indicator 24 is turned on. Accordingly, an indication mark indicating a traveling direction is drawing toward a neighboring right lane. A following vehicle 40d can refer to the indication mark in addition to the direction indicator 24.

When the vehicle 40a goes over a lane and enters the right lane which is a lane change destination as illustrated in the right part of FIG. 6, the steering wheel often remains turning to right. In this case, the indication mark indicating the traveling direction of the vehicle 40a may be drawn on a further right lane over the lane change destination. In the drawing, a vehicle 40 preceding the vehicle 40a is referred to as a preceding vehicle 40c.

Particularly, in the right part of FIG. 6, the right lane which is the lane change destination is an oncoming lane. In this case, a part of the indication mark may be drawn on the oncoming lane. This drawing of the indication mark is likely to confuse the oncoming vehicle 40b traveling on the oncoming lane, and thus it is preferable to avoid this drawing of the indication mark. Therefore, in this embodiment, drawing of the indication mark is stopped such that the indication mark is not drawn. For example, the drawing of the indication mark is stopped at a time point at which the vehicle 40a enters the right lane (goes over a line marking). Accordingly, it is possible to prevent unnecessary drawing of the indication mark on the oncoming lane.

Figure 7:
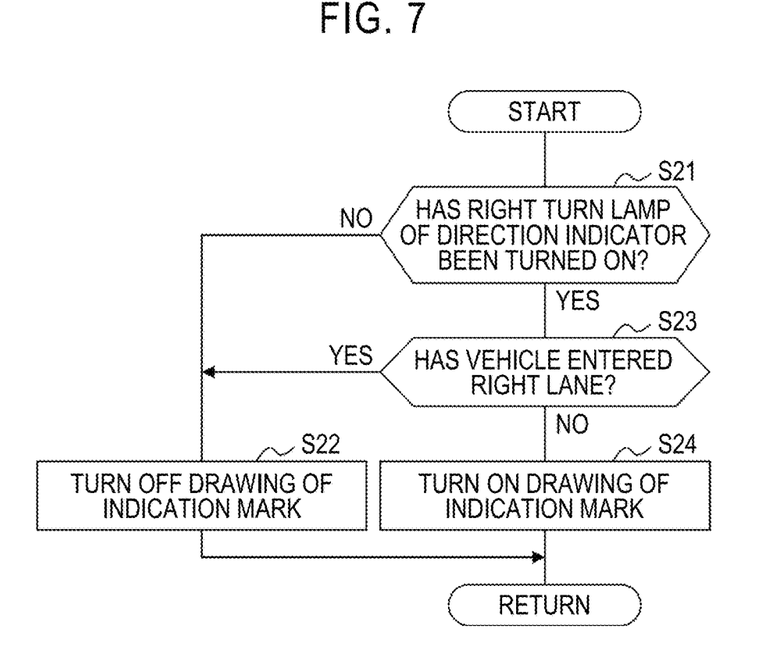
FIG. 7 is a flowchart illustrating a routine for drawing an indication mark in lane change.

FIG. 7 is a flowchart illustrating a routine for stopping drawing of an indication mark in lane change.

First, it is determined whether the right turn lamp of the direction indicator 24 is turned on (S21). When the determination result of S21 is NO, an off state of drawing of an indication mark is maintained (S22). When the direction indicator 24 is in the off state, the off state of drawing of the indication mark can be maintained in S22. Accordingly, when the direction indicator 24 is switched from the on state to the off state, drawing of the indication mark is switched from the on state to the off state. When the determination result of S21 is YES, it is determined whether the vehicle has entered the neighboring right lane (S23). When the determination result of S23 is NO, drawing of the indication mark is turned on (S24). When drawing of the indication mark is turned on, the drawing of the indication mark is maintained on the on state in S24. On the other hand, when the determination result of S23 is YES, the routine proceeds to S22 and drawing of the indication mark is turned off.

Accordingly, when the direction indicator is turned on, drawing of the indication mark is in the on state until the vehicle enters the right lane and the drawing of the indication mark is turned off after the vehicle has entered the right lane. When the direction indicator 24 is switched from on to off by a returning operation of the steering wheel before the vehicle enters the neighboring lane, drawing of the indication mark is also turned off.

Figure 8:
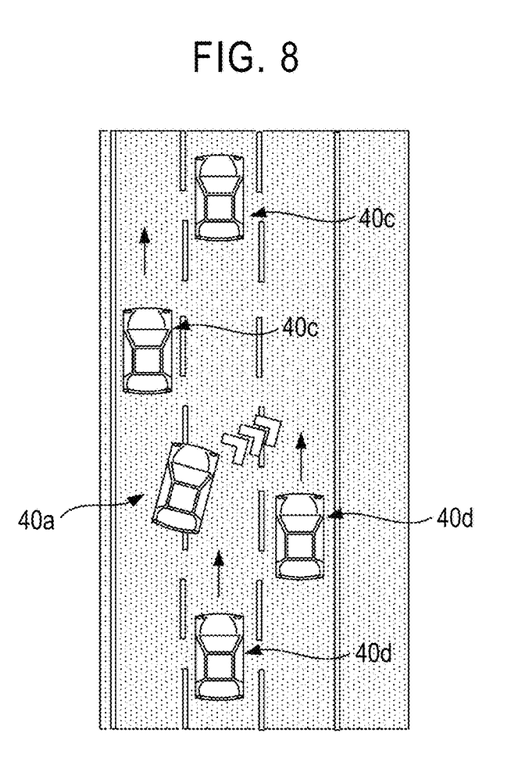
FIG. 8 is a diagram illustrating an indication mark when lane change is performed from a left lane to a central lane in a three-lane road.

FIG. 8 is a diagram illustrating an example in which lane change from a left lane to a central lane in a road with three lanes is performed. In this case, an indication mark may be unnecessarily drawn on the right lane. As described above, by stopping drawing of the indication mark at a time point at which the vehicle has entered a lane change destination (when the vehicle goes over a line marking), it is possible to prevent the indication mark from being drawn to confuse a following vehicle 40d traveling on the right lane.

Drawing at Crossing

Figure 9:
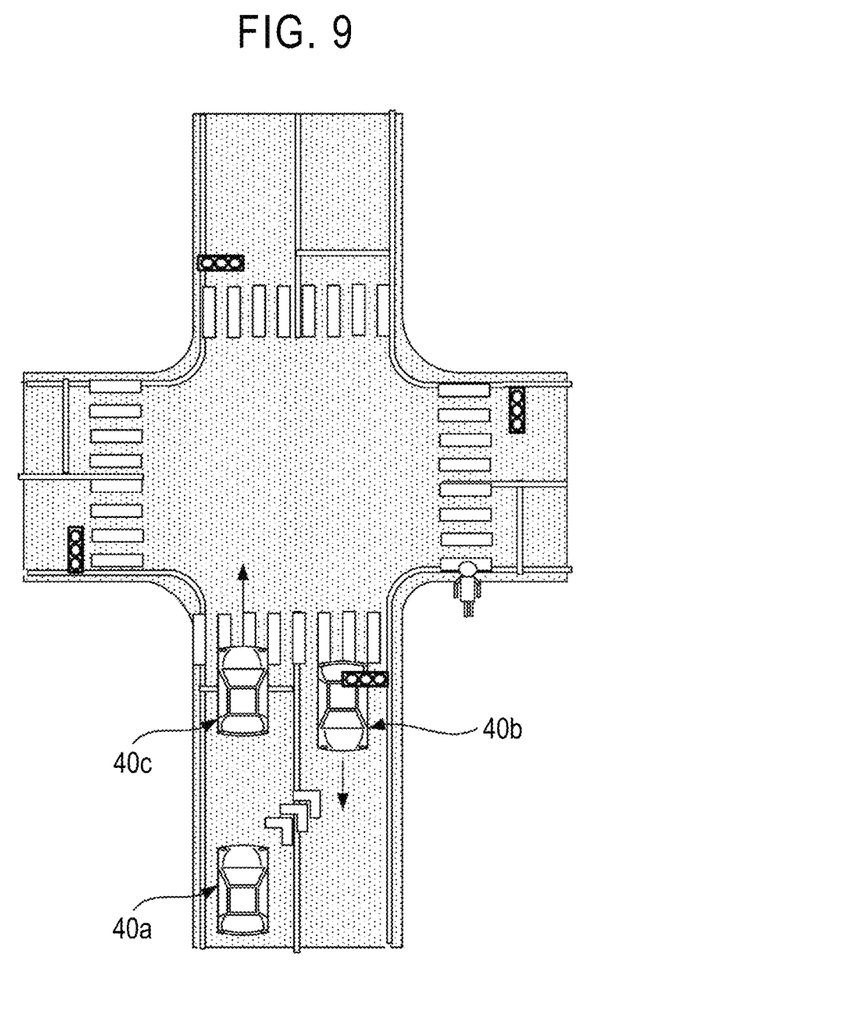
FIG. 9 is a diagram illustrating a state in which an indication mark is drawn in front of an oncoming vehicle at the time of a right turn at a crossing.

When a vehicle is going to turn to right at a crossing, the direction indicator 24 is turned on before the crossing (for example, 30 m prior to the crossing). Here, when a distance to a preceding vehicle 40c is small, an indication mark can be drawn on a road surface and thus an indication mark indicating a traveling direction is not drawn. On the other hand, when the distance to the preceding vehicle 40c is large, an indication mark is drawn. However, in a right lane before the crossing, the indication mark is drawn up to an oncoming lane. Accordingly, when an oncoming vehicle 40b is traveling as illustrated in FIG. 9, it is not preferable to draw an indication mark on a road surface in front thereof.

Therefore, in case of a right turn at a crossing, drawing of the indication mark may be started at a time point at which the vehicle has entered the crossing.

Figure 10:
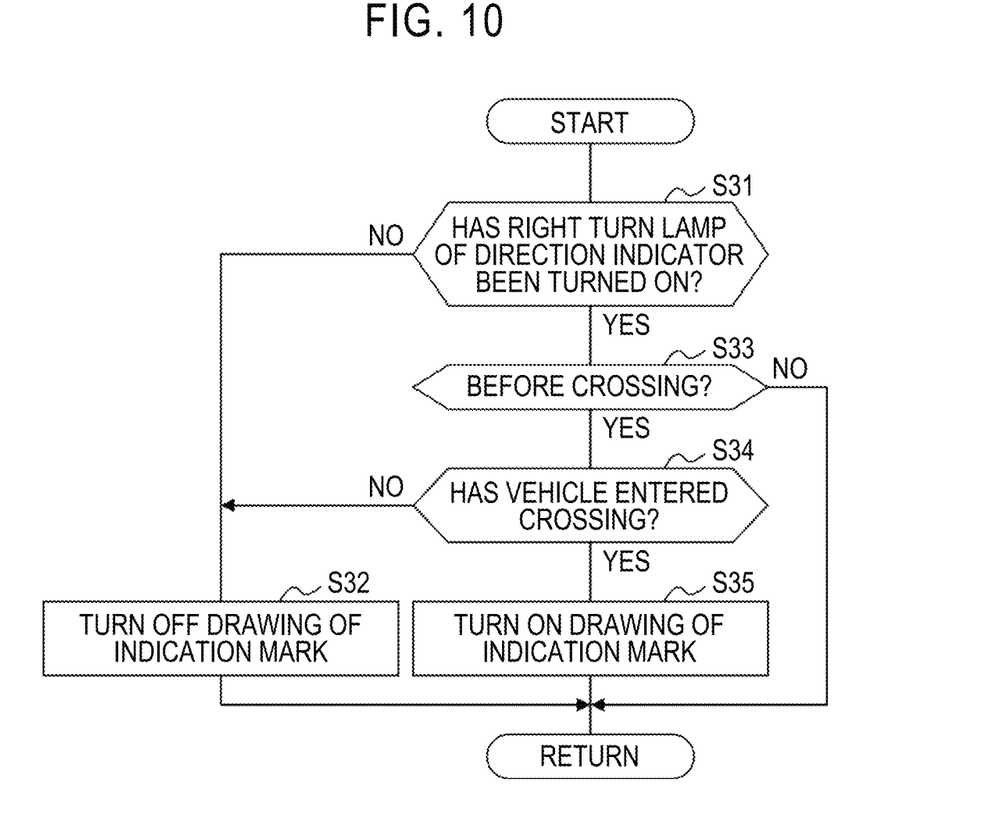
FIG. 10 is a flowchart illustrating a routine for drawing an indication mark at the time of a right turn at a crossing.

FIG. 10 is a flowchart illustrating a routine for drawing an indication mark at the time of turning to right at a crossing. It is determined whether the right turn lamp of the direction indicator 24 is turned on (S31). When the determination result of S31 is NO, drawing of the indication mark is maintained in the off state (S32). When the determination result of S31 is YES, it is determined whether the vehicle is before a crossing (S33).

When the determination result of S33 is NO, the vehicle is not located before a crossing, and thus any particular process is not performed. When the determination result of S33 is YES, it is determined whether the vehicle has entered the crossing (S34). The outline of the crossing is set to, for example, a line closer to the central side of the crossing than an end on the crossing side of a crosswalk or an extension line of an outer circumference of a road crossing the crossing, and the determination can be performed by determining whether a front end or a front wheel of the vehicle 40 has passed the outline.

When the determination result of S34 is NO, drawing of the indication mark is turned off in S32. When the determination result of S34 is YES, drawing of the indication mark is turned on (S35).

In this way, drawing of an indication mark is turned off before a crossing, and drawing of an indication mark can be turned on after the vehicle has entered the crossing. Drawing of an indication mark which has been turned on after the vehicle has entered the crossing can be turned off with turning off of the direction indicator.

Entrance into Store by a Left Turn

Figure 11:
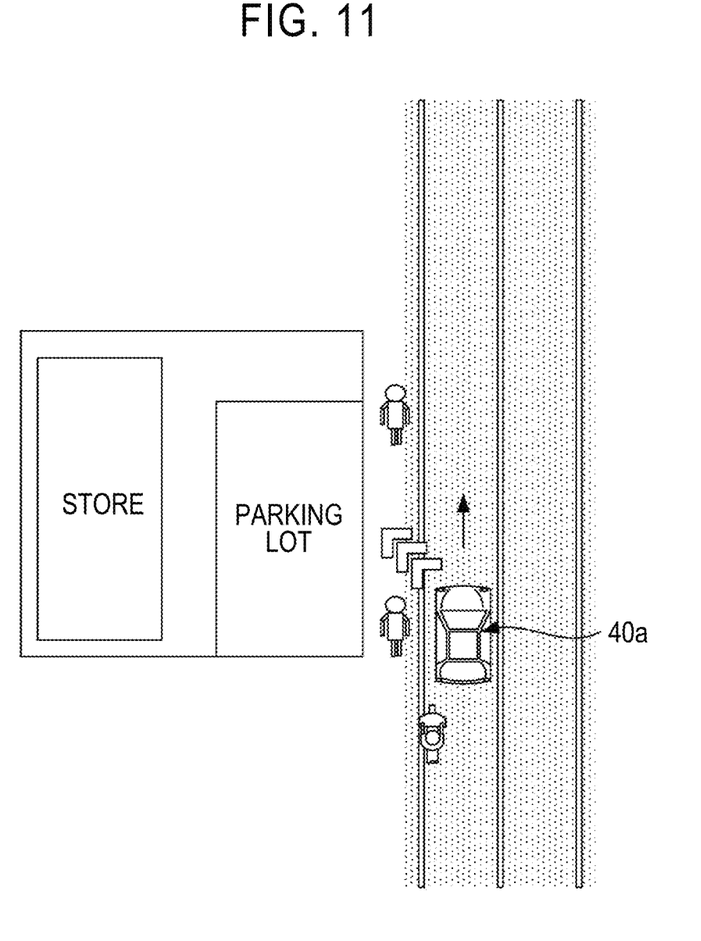
FIG. 11 is a diagram illustrating an indication mark when a vehicle enters a store by a left turn.

FIG. 11 illustrates a situation in which a vehicle 40a enters a store by a left turn. In this case, the vehicle often crosses a sidewalk on a roadside as illustrated in the drawing, and an indication mark drawn on a road surface from the vehicle 40a is seen by a pedestrian. When a pedestrian is located within a predetermined distance (several m) and a driver finds out the pedestrian and is going to depress a brake pedal to stop the vehicle 40a, drawing of the indication mark can be stopped. Accordingly, it is possible to prevent the pedestrian from stopping due to misunderstanding that the vehicle 40 keeps coming.

Figure 12:
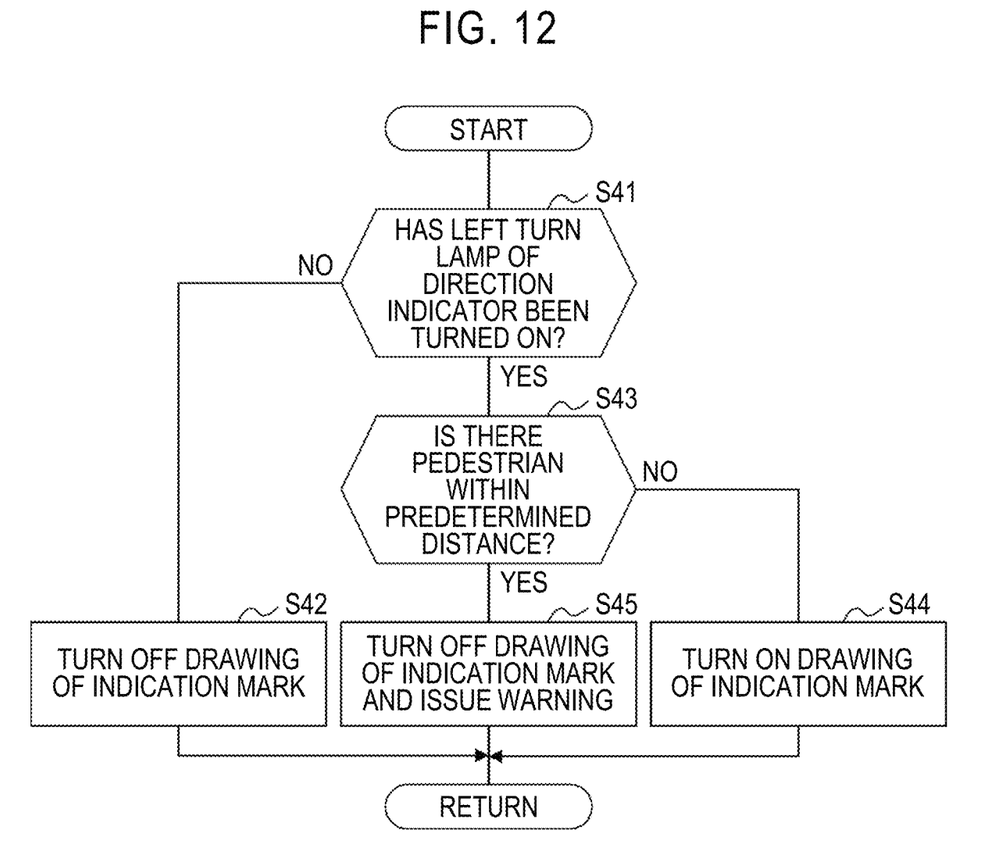
FIG. 12 is a flowchart illustrating a routine for drawing an indication mark when a vehicle enters a store by a left turn.

FIG. 12 is a flowchart illustrating a routine which is performed when a vehicle enters a store by a left turn. It is determined whether the left turn lamp of the direction indicator 24 is turned on (S41). When the determination result of S41 is NO, the off state of drawing of an indication mark is maintained (S42). When the determination result of S41 is YES, it is determined whether a pedestrian is present within a predetermined distance (for example, within 30 m before and after the vehicle) (S43). The pedestrian may walk in any direction of the same direction as the vehicle 40 and the opposite direction thereof.

When the determination result of S43 is NO, drawing of an indication mark is turned on (S44). When the determination result of S43 is YES, drawing of the indication mark is turned off (S45). In this case, a risk of collision with a pedestrian can be determined and it can be determined that there is a pedestrian when the risk of collision is equal to or greater than a predetermined value. A warning for stopping may be issued to the driver according to necessity.

Entrance into Road from Store

Figure 13:
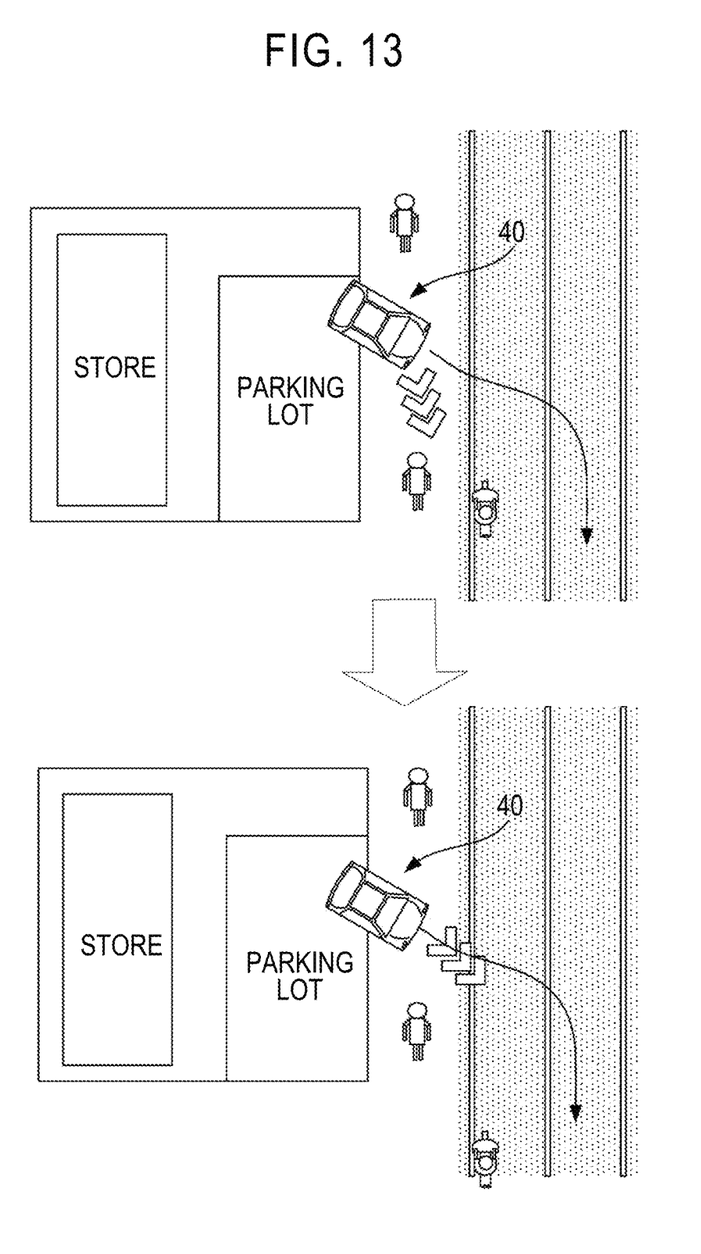
FIG. 13 is a diagram illustrating an indication mark when a vehicle enters a road from a store by right turn.

FIG. 13 is a diagram illustrating a situation in which a vehicle 40 is going to enter a road from a parking lot of a store. In this case, the vehicle 40 often crosses a sidewalk as illustrated in the drawing.

When the vehicle 40 enters the road, the vehicle 40 may enter the sidewalk obliquely with respect to an extending direction of the road on which the vehicle 40 is to travel, not perpendicularly to the sidewalk. In this case, an indication mark may be drawn as if the vehicle 40 is going to travel in the sidewalk.

In this case, it is determined that the vehicle travels to the road based on the traveling direction of the vehicle 40, and an indication mark directed to the road which the vehicle is to enter is drawn instead of an indication mark directed to the sidewalk.

It is also conceivable that drawing of the indication mark is stopped. However, another vehicle such as a motorbike may travel on the road, and a drawing position of the indication mark is changed to an optimal position from a point of view of the vehicle in consideration of a warning for the motorbike or the like.

Figure 14:
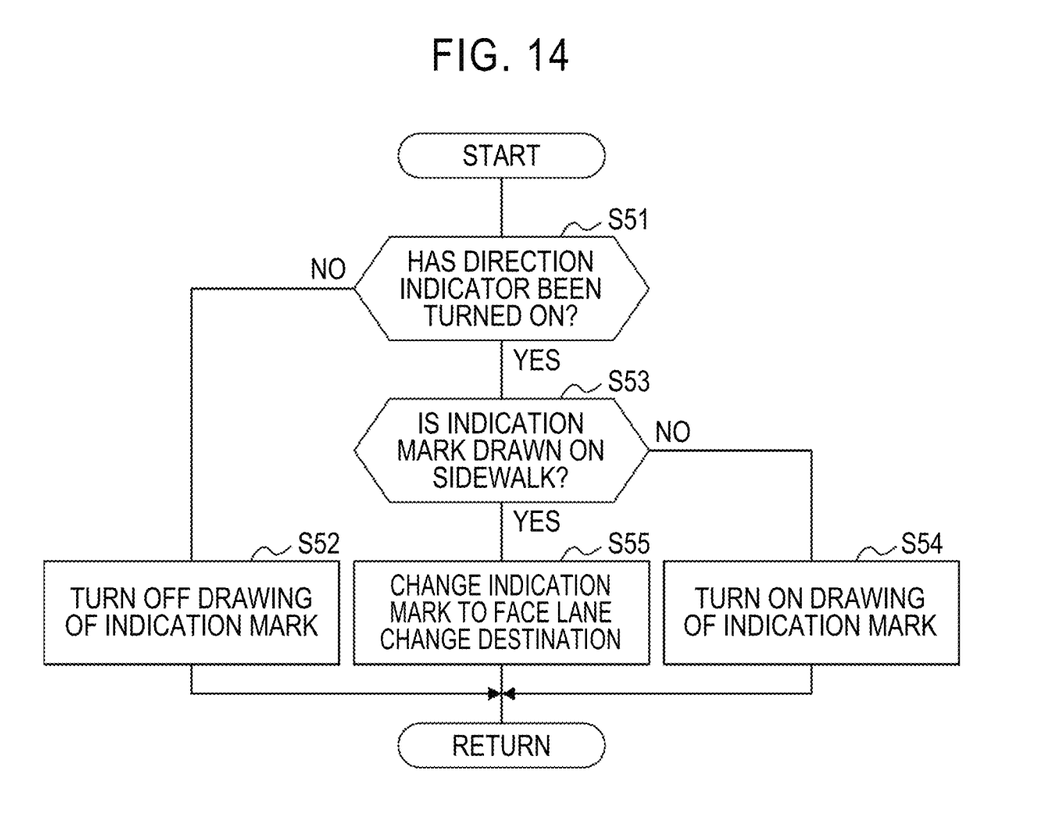
FIG. 14 is a flowchart illustrating a routine for drawing an indication mark when a vehicle enters a road from a store by right turn.

FIG. 14 is a flowchart illustrating a routine which is performed when a vehicle enters a road from a store through a sidewalk. It is determined whether the direction indicator 24 is turned on (SM). When the determination result of SM is NO, the off state of an indication mark is maintained (S52). When the determination result of S51 is YES, it is determined whether a direction of an indication mark to be drawn is directed to the sidewalk (S53). This determination can be performed using an image from the camera 16, map data, and the like.

When the determination result of S53 is NO, it is determined that the indication mark is directed to a roadway, and the indication mark is turned on (S54). When the determination result of S53 is YES, the indication mark is changed to be directed to a lane which the vehicle is to enter (S55).

When a vehicle enters a road from a store by a left turn, an indication mark may be prevented from being directed to a sidewalk by performing the same change. When the vehicle enters a road, drawing of an indication mark may be turned on after the vehicle has become sufficiently close to a road and has reached a position at which the indication mark is not directed to the road.

"Others"

The above description is based on the premise that drawing of an indication mark is turned on by operating the direction indicator 24, but control for stopping drawing of an indication mark may be performed based on the premise that drawing of the indication mark is turned on depending on a steering state. That is, drawing of an indication mark indicating a left turn is turned when steering to left is performed, drawing of an indication mark indicating a right turn is turned when steering to right is performed, and this drawing of an indication mark can be stopped as described above.

The above description is based on the premise that a left-hand traffic rule is observed and a right turn is turning of a vehicle crossing an oncoming lane, but a left turn in right-hand traffic corresponds to the right turn in this specification. Information supplied from the outside via the communication device 22 in addition to information acquired from the position detection device 12, the navigation device 14, the camera 16, the sensor 18, and the direction indicator 24 can be used for a situation of a vehicle 40, and the correct situation of the vehicle 40 can be detected in combination thereof.

What is claimed is:

1. A vehicular drawing device that is mounted in a vehicle and draws an indication mark of a predetermined shape on a road surface in a traveling direction of the vehicle using light, wherein:
   drawing of the indication mark on the road surface is performed when a direction indicator is operating or when steering of the vehicle is being performed; and
   drawing of the indication mark is stopped when predetermined conditions are satisfied, wherein
   drawing of the indication mark indicating that the vehicle is traveling to an oncoming lane is stopped when there is an oncoming vehicle,
   drawing of the indication mark is not stopped when the vehicle is located within a crossing, and
   drawing of the indication mark outward of a lane which is a lane change destination is stopped when a lane in which the vehicle is traveling is changed.

2. The vehicular drawing device according to claim 1, wherein drawing of the indication mark is stopped when the vehicle passes over a sidewalk on a roadside to enter the sidewalk and the direction indicator is operating but steering is not being performed.

3. The vehicular drawing device according to claim 1, wherein drawing of the indication mark in a direction parallel to a sidewalk on a roadside on the sidewalk is prohibited or an indication mark to be drawn is changed to display entrance into a road when the vehicle passes over the sidewalk to enter the road.

4. A vehicular drawing device that is mounted in a vehicle and draws an indication mark of a predetermined shape on a road surface in a traveling direction of the vehicle using light, wherein:
   drawing of the indication mark on the road surface is performed when a direction indicator is operating or when steering of the vehicle is being performed; and
   drawing of the indication mark is stopped when the vehicle enters a sidewalk and the direction indicator is operating but steering is not being performed.

5. A vehicular drawing device that is mounted in a vehicle and draws an indication mark of a predetermined shape on a road surface in a traveling direction of the vehicle using light, wherein:
   drawing of the indication mark on the road surface is performed when a direction indicator is operating or when steering of the vehicle is being performed; and
   drawing of the indication mark is in a direction parallel to a sidewalk is prohibited or an indication mark to be drawn is changed to display entrance into a road when the vehicle enters the road from a sidewalk.

6. A vehicular drawing device that is mounted in a vehicle and draws an indication mark of a predetermined shape on a road surface in a traveling direction of the vehicle using light, wherein:
   drawing of the indication mark on the road surface is performed when a direction indicator is operating or when steering of the vehicle is being performed; and
   a direction in which the indication mark is drawn is changed to a direction directed to a target lane when a direction of the indication mark of the predetermined shape is not directed to the target lane;
   drawing of the indication mark indicating that the vehicle is traveling to an oncoming lane is stopped when there is an oncoming vehicle.

* * * * *